Figure 1:
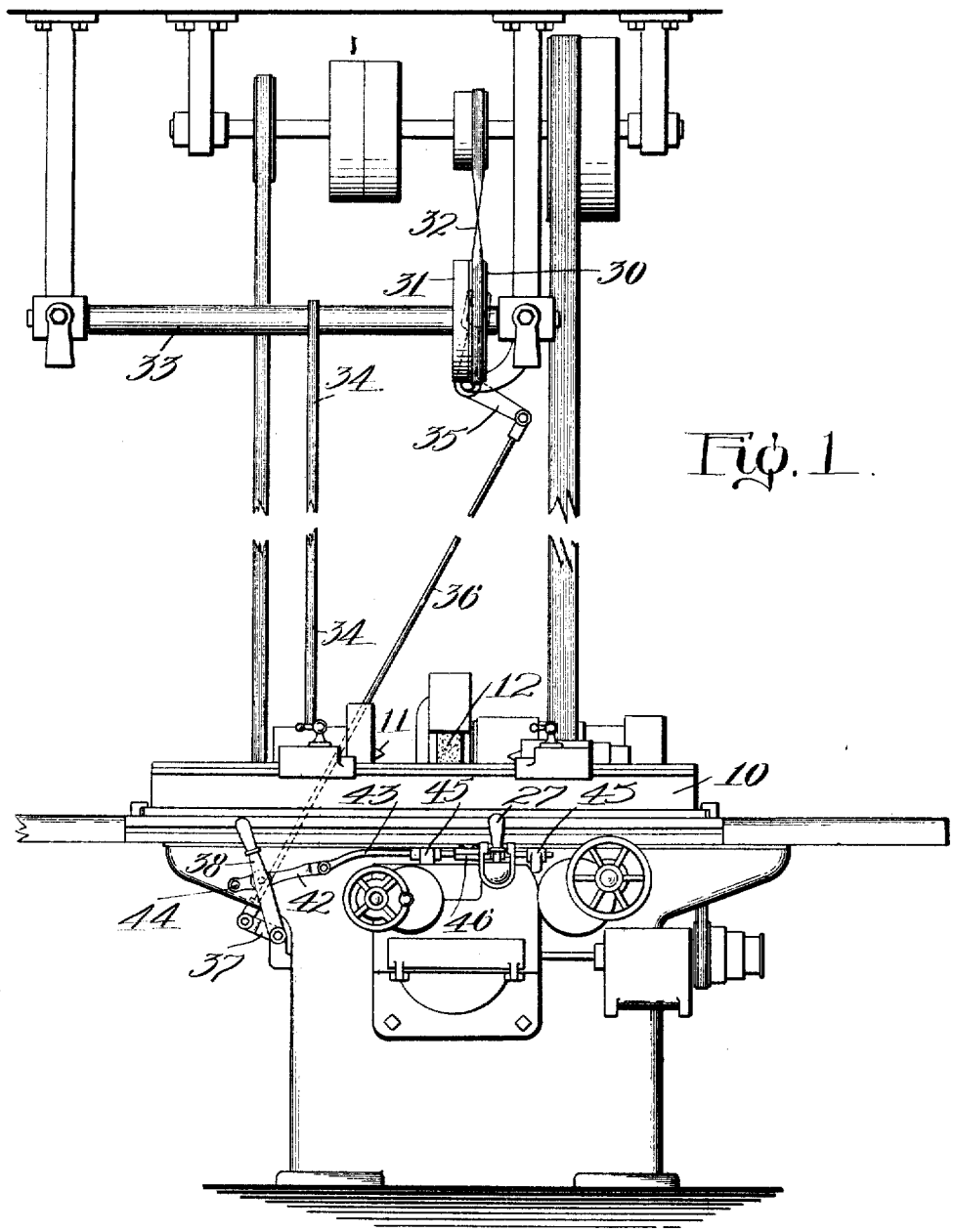

C. H. NORTON.
WORK AND TABLE STOP MECHANISM.
APPLICATION FILED JUNE 19, 1909. RENEWED OCT. 19, 1911.

1,009,991.

Patented Nov. 28, 1911.
2 SHEETS—SHEET 1.

C. H. NORTON.
WORK AND TABLE STOP MECHANISM.
APPLICATION FILED JUNE 19, 1909. RENEWED OCT. 19, 1911.
1,009,991.
Patented Nov. 28, 1911.
2 SHEETS—SHEET 2.
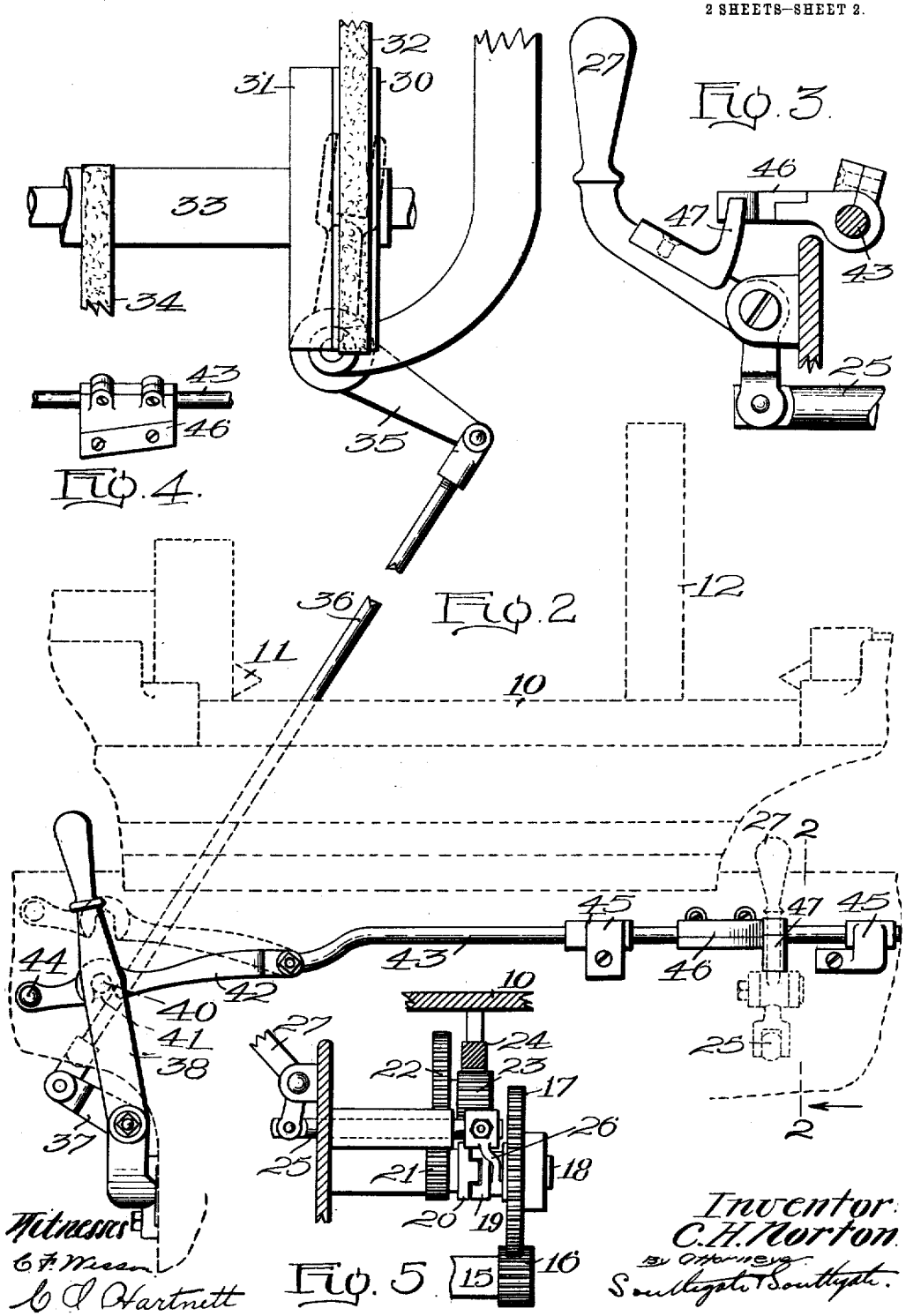

UNITED STATES PATENT OFFICE.

CHARLES H. NORTON, OF WORCESTER, MASSACHUSETTS, ASSIGNOR TO NORTON GRINDING COMPANY, OF WORCESTER, MASSACHUSETTS, A CORPORATION OF MASSACHUSETTS.

WORK AND TABLE STOP MECHANISM.

1,009,991.  Specification of Letters Patent.  Patented Nov. 28, 1911.

Application filed June 19, 1909, Serial No. 503,154. Renewed October 19, 1911. Serial No. 655,639.

*To all whom it may concern:*

Be it known that I, CHARLES H. NORTON, a citizen of the United States, residing at Worcester, in the county of Worcester and State of Massachusetts, have invented a new and useful Work and Table Stop Mechanism, of which the following is a specification.

This invention relates to a work and table-stop mechanism capable of general use, but particularly adapted for grinding machines.

As ordinarily and generally manufactured grinding machines are so arranged that the drive for rotating the work is controlled independently of the means for controlling the reciprocation of the table on which the work is carried.

The principal objects of this invention are to provide simple, convenient, and easily operated mechanism whereby although a separate control can be had if desired, yet the parts can be set very simply so that when the rotation is stopped the reciprocation of the table will be stopped simultaneously and automatically; and to provide certain improvements in the details of construction of the mechanism for controlling said rotation and reciprocation.

Further objects and advantages of the invention will appear hereinafter.

Reference is to be had to the accompanying drawings in which—

Figure 1 is a side view of a grinding machine of well-known form with a preferred form of this invention applied thereto; Fig. 2 is a side view of the controlling mechanism for the rotation of the work and the reciprocation of a grinding machine table showing a portion of the grinding machine in dotted lines. Fig. 3 is a sectional view on the line 2—2 of Fig. 2; Fig. 4 is a plan of a detail of construction thereof and Fig. 5 is a sectional view showing one form of mechanism for starting and stopping the reciprocation of the table.

The invention is illustrated as applied to a grinding machine the construction of which is not shown, but which involves a reciprocating table 10, a rotary head-spindle 11 for rotating the work, and a grinding wheel 12. The grinding wheel is operated in any desired way, and the table is shown as being reciprocated by means of a shaft
15 which has a reversing rotary motion in one direction and then in the other governed by the usual table dogs or in any other desired way. On this shaft is a gear or pinion 16 which operates a gear 17 on a shaft 18. Mounted to rotate with this gear is a clutch member 19 adapted to be connected with a companion clutch member 20 which is fixed to a gear 21. This gear operates a gear 22 and a gear 23 which latter operates a rack 24 on the table. The gear 17 and clutch member 19 are capable of moving back and forth on a shaft 18, the gear in the meantime always remaining in mesh with the pinion 16. For causing this movement a reciprocating rod 25 is shown having an arm 26 thereon which directly reciprocates the gear and clutch member. This rod is operated by a table-stop lever 27 which is pivoted in a convenient position and adapted to be manually operated. It will be obvious that when this lever is in the position shown in Fig. 4 the clutch members are together and the table will be reciprocated regularly in accordance with the situation of the dogs or other controlling devices, but when the lever is turned down at its outer end the clutch members will be apart and although the gear 17 will rotate regularly first in one direction and then in the other yet the table will be stopped.

The rotation of the work located on the table may be controlled in many ways, but it is shown as being controlled by a tight and loose pulley 30 and 31 on which is located a driving belt 32. The tight pulley is connected with a long drum 33 on which is a transmission belt 34. This belt in a well-known way is connected with a cone pulley (not shown) which operates the head-stock spindle 11 in all positions of the work table.

In order to shift the belt 32 from the tight pulley to the loose pulley and vice versa, a shipping arm 35 is shown connected by a rod 36 with an arm 37 fixed to a manually operated controlling lever 38. This lever is shown in the position in which the belt is on the tight pulley and the parts operating. On this lever is mounted a pin 40 over which is adapted to fit a slot 41 in an arm 42 which is pivoted to a sliding rod 43. This arm is also provided with a handle 44. This rod reciprocates in bearings 45 on the front of the machine and upon it is located a wedge 46. This wedge preferably is located between the bearings and removably mounted on the rod so that it can be set thereon in any desired position. When the lever or handle 38 is moved to a position to stop the rotation of the work the arm 42 and rod 43 will be moved to the right in Fig. 1, and the wedge 46 will be caused to engage a shoe 47 which is mounted on the table-stop lever 27. On account of the slanting operating surface of the wedge it will force the table stop lever down into stopping position so that the table is stopped simultaneously with the rotation of the work. In this way there is no danger of the table reciprocating after the work stops rotating, and consequently no danger of grinding a flat surface on the work. Yet at the same time the table-stop lever can be operated entirely independently of the lever 38 when the latter is in position for causing the work to be rotated, and even when it is out of that position, both levers can be operated independently simply by lifting up the arm 42 by means of the handle 44 to disconnect the former from the lever 38.

It will be seen therefore that all the operations which are customary can be performed, and in addition to this the ordinary operation of the device will be to stop these two motions simultaneously.

While I have illustrated and described a preferred embodiment of the invention I am aware that many modifications can be made therein by any person skilled in the art without departing from the scope of the invention as expressed in the claims. Therefore I do not wish to be limited to all the details of construction shown and described but What I do claim is:—

1. In a grinding machine, the combination of a table, a head-stock spindle, means for reciprocating the table, means for rotating the head-stock spindle, means for disconnecting the reciprocating means from a source of power, means for disconnecting the rotating means from a source of power, and means whereby when the rotating means is disconnected the reciprocating means will also be automatically disconnected.

2. The combination with a table, a head-stock spindle, means for reciprocating the table, and independent means for rotating the head-stock spindle, whereby the reciprocation of the table can be stopped without stopping the rotation of the head-stock spindle, of a lever, means connected therewith for disconnecting the rotating means from its source of power, and means whereby when this lever is operated to stop the rotating means the reciprocating means will also be stopped simultaneously.

3. The combination with a table, a head-stock spindle, means for reciprocating the table, and means for rotating the head-stock spindle, of a hand lever, means connected therewith for disconnecting the rotating means from its source of power, a reciprocating bar connected with said handle to be operated thereby, and means on the bar for controlling the reciprocation of the table, whereby when said lever is operated to stop the rotating means the reciprocating means will also be stopped.

4. The combination with a table, a head-stock spindle, means for reciprocating the table, and means for rotating the head-stock spindle, of a hand lever, means connected therewith for disconnecting the rotating means from the source of power, and a manually controlled table stop lever adapted to operate independently of the first named lever, and a wedge movable by the first named lever for moving the table stop lever to stopping position.

5. In a device of the character described, the combination of a hand operated lever, a driving device, a belt therefor, means connected with said lever for shipping the belt, a table stop lever, a table adapted to be set into reciprocating motion or stopped by the operation of the table-stop lever, and means connected with the first named lever for moving the table stop lever to stopping position.

6. In a device of the character described, the combination of a hand operated lever, a driving device, a belt therefor, means connected with said lever for shipping the belt, a table stop lever, a reciprocatory table adapted to be set into motion or stopped by the operation of the table-stop lever, a reciprocating rod connected with the first named lever, a wedge mounted on said rod, and a shoe on said lever in position to be engaged by the wedge when the rod is moved, whereby the lever will be turned.

7. In a device of the character described, the combination of a lever having a pin thereon, a driving device, means connected with said lever for shipping a belt on the driving device, a reciprocating rod, an arm pivoted on said rod and having a slot adapted to receive said pin, whereby the operation of the lever will reciprocate the arm and rod, a table-stop lever, and means on the rod for operating the table-stop lever.

8. In a device of the character described, the combination of a lever having a pin thereon, a driving device, means connected with said lever for shipping a belt on the driving device, a reciprocating rod, an arm pivoted on said rod and having a slot adapted to receive said pin, whereby the operation of the lever will reciprocate the arm and rod, a table-stop lever, and means on the rod for operating the table-stop lever, said arm having a handle thereon by which it can be lifted out of engagement with the pin so that the first named lever can be operated without moving the table-stop lever.

9. In a device of the character described, the combination of a table, means for reciprocating it, a hand operated lever for controlling the reciprocation of the table, a shoe on said lever, a movable rod, and means on the rod for engaging the shoe and turning said lever to stopping position.

In testimony whereof I have hereunto set my hand, in the presence of two subscribing witnesses.

CHARLES H. NORTON.

Witnesses:
ALBERT E. FAY,
J. ELMER HALL.